United States Patent Office
3,468,234
Patented Sept. 23, 1969

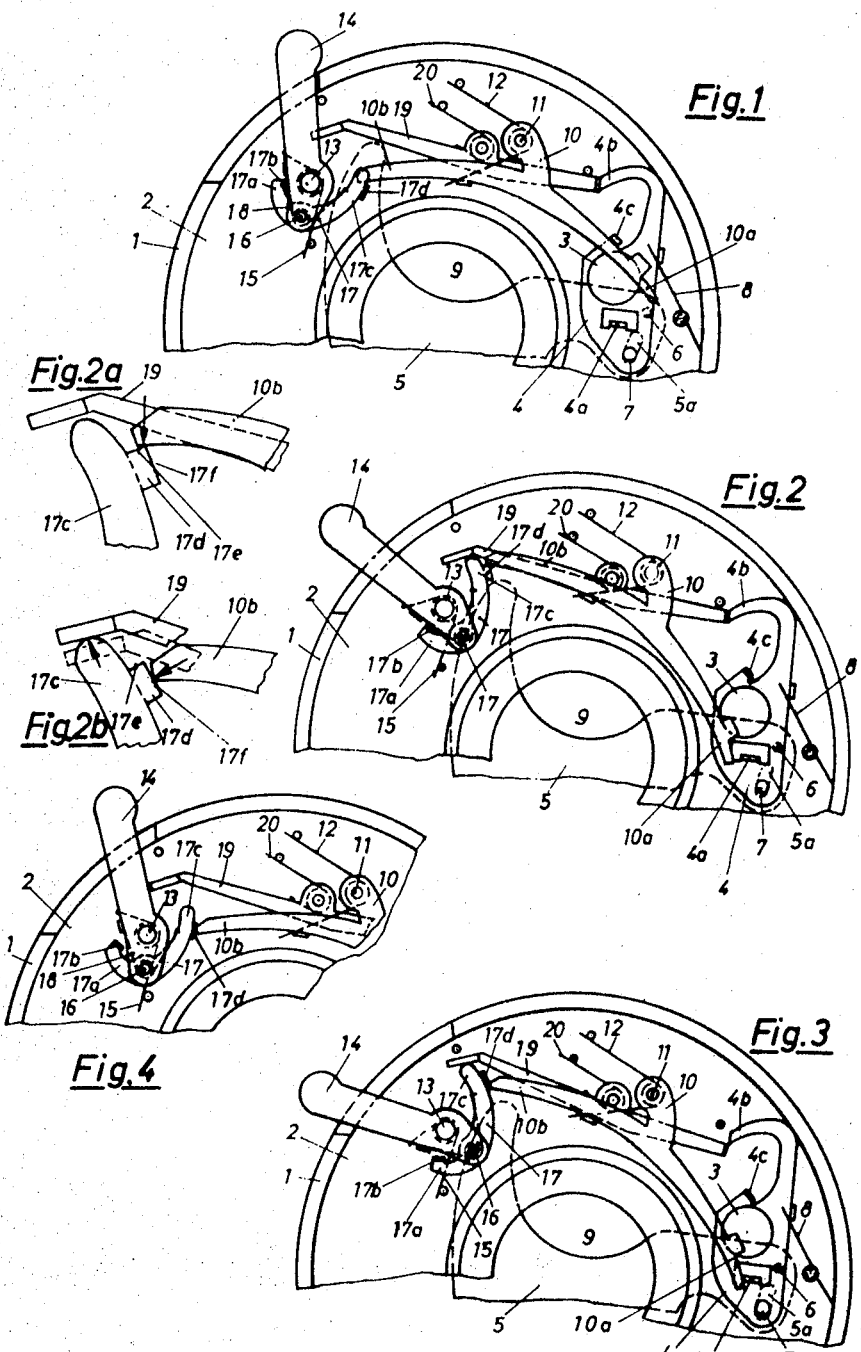

3,468,234
PHOTOGRAPHIC SELF-COCKING SHUTTER
Erwin Weller, Calmbach, Black Forest, Germany, assignor to Prontor-Werk Alfred Gauthier, G.m.b.H., Calmbach, Black Forest, Germany, a corporation of Germany
Filed June 2, 1966, Ser. No. 554,855
Claims priority, application Germany, June 3, 1965,
P 36,960
Int. Cl. G03b 9/08
U.S. Cl. 95—53          7 Claims

ABSTRACT OF THE DISCLOSURE

A photographic self-cocking shutter is provided having shutter blades with open and closed positions and a cocking and release lever. In addition, a driving lever is provided which is conveyable into the cocked position by means of the cocking and release lever. An actuating member is engageable with the driving lever for driving the shutter blades, and a locking member is provided for securing the actuating member in a starting position corresponding to the closed position of the shutter blade. A driver is carried by the cocking and release lever and acts upon the driving lever during the cocking process; the driver being disengaged from the driving lever upon reaching the cocked position. The driving lever acts upon the driver in the starting phase of the motion in which the driving lever returns to its original position so that the locking member is moved out of its locking position and the shutter is thereby released.

---

The present invention relates to a photographic self-cocking shutter having a spring-loaded shutter blade driving lever which can be conveyed into cocked position by a cocking and release lever, and which can be brought into engagement with an actuating member secured by a locking member in the starting or initial position of the shutter blades.

In the conventional shutter of the preceding species, the cocking and release lever must always be moved over a greater distance than that required for conveying the driving lever into cocked position. After the driving lever designed to drive the shutter blade actuating member has been released, the overtravel is used to guide a locking member, which secures the shutter blade actuating member in its starting position out of the locking position.

This conventional shutter arrangement requires further improvement because it is possible that, upon actuation of the cocking and release lever, the locking member blocking the shutter blade actuating member is not moved out of the locking position. This malfunctioning of the locking member is possible even though the driving lever cooperating with the shutter blade actuating member is released. As a result, the driving lever and the shutter blade actuating member are both prevented from exercising their functions, since the locking member blocks not only the shutter blade actuating member, but, in addition thereto, the entire mechanical shutter system. The conventional arrangement is particularly unfavorable because it can mislead the photographer into believing that he has released the shutter when, in fact, such release has not taken place. Thus, during the cocking and release process when the driving lever is disengaged from the cocking and release lever, a sudden drop is experienced in the cocking moment which normally increases continuously in the course of the cocking process. Taking this action in conjunction with an operating sound that is heard, it becomes apparent as to why the photographer may conclude that he has effected a release of the shutter. Such release, however, has not prevailed, because the locking member was not disengaged due to the inadvertent premature interruption of the release motion.

Accordingly, it is an object of the present invention to provide an improved shutter arrangement whereby the functional sequence of the shutter is guided in a positive and automatic manner when the driving lever designed to drive the shutter blades is released for exercising its function.

Another object of the present invention is to provide an improved shutter arrangement, as set forth, having a minimum number of structural elements for compactness, high reliability and low maintenance.

The invention achieves these objects by providing that the cocking and release lever carry an articulately arranged driver which acts on the driving lever while abutting against the cocking and release lever, during the cocking process. The driver disengages from the driving lever after the cocked position has been reached, and is acted upon by the driving lever so that it is moved against the locking member, in the starting phase of the return motion of the driving lever. The locking member is thereby moved out of the locking position and effects the release of the shutter.

With this arrangement, the photographer has to depress merely the cocking and release lever, under continuously increasing cocking moment, until the driving lever has been conveyed into the cocked position. The remaining functional steps are carried out in an automatically guided sequence, and accordingly the intended exposure is reliably executed. In view of the fact that with the application of the invention there is no misleading sound and no temporary drop of the normally increasing cocking moment, while the cocking and release lever is actuated, the photographer is not subject to an error-prone apparatus.

An advantageous embodiment of the present invention can also be achieved by providing that the driver kept in engagement with the cocking and release lever by a spring, be designed in the form of a lever whose end, cooperating with the driving lever and engaging the locking member, comprises a driving lug.

The detailed description and operation of the novel features of the invention appear in the following specification taken in conjunction with the accompanying drawing in which:

FIGURE 1 is a partial top view of a self-cocking shutter in the non-operating position with the cover plate removed.

FIGURE 2 is a view similar to that of FIGURE 1, showing the shutter at the end of the cocking motion, and shortly before the driving lever is disengaged from the driver.

FIGURE 2a is an enlarged view of a detail in FIGURE 2.

FIGURE 2b shows the relative positions of the driver, driving lever, and an arresting lever in the starting phase of the reverse motion of the driving lever, the dotted lines being representative of the position occupied by the arresting lever in FIGURE 2a.

FIGURE 3 shows the shutter at the moment it is released by the driving lever for executing the exposure.

FIGURE 4 shows the cocking and release lever in an intermediate position during the process of returning to the starting position.

Referring to the drawing, the housing 1 of the self-cocking shutter is adapted to retain a base plate 2 in the commonly-known manner. The base plate serves to receive and hold the members of the shutter mechanism. The base plate carries a pivot shaft 3 on which a lever 4 is positioned. The lever functions to actuate a pair of shutter blades 5 situated at the rear of the base plate. Only one of these shutter blades is shown in the drawing for the sake of simplicity and clarity. The two shutter blades 5 are positioned on fixed pins 6, and each of the blades is provided with a slot 5a engaging a driving pin 7 fixed to the lever 4.

When the shutter is in the non-operating state, the shutter blade actuating lever 4, due to the action of spring 8, occupies the position shown in FIGURE 1. In this position the shutter blades are closed. By pivoting the lever 4 counterclockwise, the shutter blades 5 reach the open position in which they release the exposure aperture 9 of the shutter.

A two-armed driving lever 10 positioned on a fixed pin 11, is designed to drive the shutter blade actuating lever 4. A driving spring 12 applies a counter-clockwise moment 4. A driving spring 12 applies a counter-clockwise moment to the lever 10. The arm 10a of the lever 10 co-operates, in a manner to be described, with a driving lug 4a bent up from the shutter blade actuating lever 4. The other arm 10b connects to a cocking and release device. This device comprises a cocking and release lever 14 rotatably positioned on a fixed pin 13, and held in the starting position of FIGURE 1 due to the action of the return spring 15.

A driver 17 in the form of a release, is articulately connected to the cocking and release lever 14 by means of pin 16. For the intended purpose, the driver 17 may be constructed in the form of a two-armed lever or a one-armed lever. In the case of a two-armed lever, shown in the drawing, the arm 17a is able to abut against the cocking and release lever 14 with the lug 17b, due to the action of a relatively weak spring 18. At the same time, the other arm 17c cooperates, through the bent-up lug 17d, with the driving lever arm 10b for the purpose of both, conveying lever 10 into the cocked position and releasing a locking device. In this connection, the arm 17c of the driver is also associated with an arresting lever 19 positioned on a fixed pivoting shaft. The arresting lever is acted upon by a restoring spring 20 to hold it in the locking position when the shutter is in the non-operating position (FIG. 1), and when the driving lever 10 is conveyed into the cocked position (FIG. 2). As a result, the arresting lever 19 is located within the range of motion of the shutter blade actuating lever 4, and thereby blocks the latter in the position that it occupies.

The preceding shutter arrangement operates in the following manner:

When the cocking and release lever 14 is depressed, it rotates in a counter-clockwise direction from the non-operating position shown in FIGURE 1. This rotation occurs about pin 13 and, at first, rigidly together with the driver 17 articulately connected to the cocking and release lever. During this part of the process, the driving lever 10, whose arm 10b abuts against the driver edge 17e (FIGURE 2a), executes a clockwise rotary motion. At the same time, the tension of the driving spring 12 is continuously increased. As the cocking motion progresses, the driving lever arm 10a slides over and past the driving lug 4a, and finally drops behind this lug of the shutter blade actuating lever 4. After a comparatively short amount of overtravel of the arm 10a in relatioin to the driving lug 4a (FIG. 2), the driving lever arm 10b disengages from the supporting edge 17e, as the maximum cocking moment is reached.

The exposure process is thereby initiated, for the arm 10b now engages, with its free end, the edge 17f of lug 17d due to the action of the driving spring 12 (FIG. 2b). The spring-loaded driving lever 10 now exerts, with respect to pin 16, a counter-clockwise moment on the driver 17. As a result, the free end of the driver arm 17c bears against the arresting lever 19, and the latter is moved, in a guided manner, from the arresting position into the position of FIGURE 3, in which the arresting lever has just released the arm 14b. This particular action takes place without any aid from the photographer.

The driving lever arm 10a impinges, thereafter, on the driving lug 4a of the shutter blade actuating lever 4. At the same time, the other arm 10b is disengaged from the bearing edge 17f of the lug 17d. Due to the action of the driving lever 10, the shutter blade actuating lever 4 now executes a counter-clockwise pivoting motion during which the shutter blades 5 are opened. After this has occurred, the driving lever arm is disengaged from the driving lug 4a and impinges, at the same moment, on the lug 4c of the shutter blade actuating lever 4. The latter is thereby returned to its starting position in which it will again be locked by the arresting lever 19. During this returning motion, the shutter blade actuating lever 4 closes the shuter blades 5. By thus removing the load on the cocking and release lever 14, the latter is moved into the non-operating position illustrated in FIGURE 1. This results from the action of the return spring 15, and the ability of the driver 17 to yield against the action of the weak spring 18 and the arm 10b of the driving lever 10.

What is claimed as new and desired to protect by Letters Patent is:

1. In a photographic self-cocking shutter with shutter blades having open and closed positions, a cocking and release lever, a driving lever conveyable into cocked position by means of said cocking and release lever, an actuating member engageable with said driving lever for driving said shutter blades, a locking member for securing said actuating member in the starting position corresponding to the closed position of said shutter blades, and a driver pivotally mounted on said cocking and release lever and acting upon said driving lever during the cocking process, said driver being supported in fixed position by said cocking and release lever during the cocking operation, said driver releasing said driving lever upon reaching the cocked position and said driver being moved against said locking member by said driving lever, said driving lever acting upon said driver in the starting phase of the motion in which said driving lever returns to its original position so that said locking member is moved out of its locking position and said shutter is thereby released to execute its function.

2. A photographic self-cocking shutter as defined in claim 1, including a spring for spring loading said driving lever.

3. A photographic self-cocking shutter as defined in claim 1, including a spring for maintaining said driver engaged with said cocking and release lever.

4. A photographic self-cocking shutter as defined in claim 1, wherein said driver comprises a lever cooperating with said driving lever and engaging said locking member.

5. A photographic self-cocking shutter as defined in claim 1, wherein said driver comprises a lever having an end cooperating with said driving lever and engaging said locking member.

6. A photographic self-cocking shutter as defined in claim 1, including a lug associated with said driver said lug cooperating with said driving lever and engaging said locking member.

7. A photographic self-cocking shutter as defined in claim 1, wherein said driver comprises a lever having a driving lug cooperating with said driving lever and engaging said locking member.

References Cited

UNITED STATES PATENTS 3,270,649    9/1966    Starp _____ 95—63

JOHN M. HORAN, Primary Examiner

U.S. Cl. X.R.

95—63